(12) United States Patent
Yatagai et al.

(10) Patent No.: US 7,497,292 B2
(45) Date of Patent: *Mar. 3, 2009

(54) SNOWMOBILE WITH INTERCOOLER

(75) Inventors: Yasuaki Yatagai, Hamamatsu (JP); Takashi Nishihara, Hamamatsu (JP)

(73) Assignee: Suzuki Kabushiki Kaisha, Hamamatsu-shi (JP)

( * ) Notice: Subject to any disclaimer, the term of this patent is extended or adjusted under 35 U.S.C. 154(b) by 7 days.

This patent is subject to a terminal disclaimer.

(21) Appl. No.: 11/697,566

(22) Filed: Apr. 6, 2007

(65) Prior Publication Data

US 2007/0175687 A1  Aug. 2, 2007

Related U.S. Application Data

(62) Division of application No. 11/080,654, filed on Mar. 16, 2005, now Pat. No. 7,222,689.

(30) Foreign Application Priority Data

Mar. 18, 2004  (JP) ............... 2004-078440

(51) Int. Cl.
*B62M 27/02* (2006.01)
(52) U.S. Cl. .................... 180/190; 180/186; 123/196 R
(58) Field of Classification Search ................. 180/190, 180/182, 186, 68.1, 68.2, 68.4, 291; 123/196 R
See application file for complete search history.

(56) References Cited

U.S. PATENT DOCUMENTS

| 4,008,777 | A | | 2/1977 | Juto et al. |
| 4,155,414 | A | * | 5/1979 | Fujikawa et al. ............ 180/182 |
| 5,117,932 | A | * | 6/1992 | Kurosu et al. ............... 180/68.2 |
| 5,129,473 | A | * | 7/1992 | Boyer ......................... 180/68.1 |
| 5,152,365 | A | | 10/1992 | Aoshima |
| 5,251,718 | A | * | 10/1993 | Inagawa et al. ............. 180/190 |
| 5,660,245 | A | * | 8/1997 | Marier et al. ................ 180/190 |
| 6,415,759 | B2 | | 7/2002 | Ohrnberger et al. |
| 6,651,765 | B1 | | 11/2003 | Weinzierl |
| 6,848,528 | B2 | | 2/2005 | Pichler et al. |
| 6,848,529 | B2 | | 2/2005 | Moriyama |
| 6,929,081 | B2 | | 8/2005 | Pichler et al. |
| 7,036,619 | B2 | | 5/2006 | Yatagai et al. |
| 7,147,074 | B1 | * | 12/2006 | Berg et al. ................... 180/190 |
| 7,198,127 | B2 | * | 4/2007 | Yatagai et al. .............. 180/190 |
| 7,204,331 | B2 | * | 4/2007 | Yatagai et al. .............. 180/190 |
| 7,222,689 | B2 | * | 5/2007 | Yatagai et al. .............. 180/190 |

* cited by examiner

*Primary Examiner*—Hau V Phan
(74) *Attorney, Agent, or Firm*—Oblon, Spivak, McClelland, Maier & Neustadt, P.C.

(57) ABSTRACT

A snowmobile with an intercooler includes a four-stroke-cycle engine unit disposed in an engine room covered by an engine hood, and the engine unit includes an engine body, a turbocharger, an intercooler for cooling an intake-air, which is pressurized and heated up by the turbocharger, and an electric motor-driven cooling fan provided for the intercooler for introducing an outside air to the intercooler through which the air after cooling the intercooler is discharged toward the inside of the engine room.

7 Claims, 11 Drawing Sheets

SNOWMOBILE WITH INTERCOOLER

CROSS-REFERENCE TO RELATED APPLICATIONS

The present application is a Divisional Application of prior application Ser. No. 11/080,654, filed on Mar. 16, 2005 now U.S. Pat. No. 7,222,689, the entire contents of which are hereby incorporated herein by reference in their entirety. The present application claims priority to Japanese Patent Application No. JP 2004-078440, filed on Mar. 18, 2004.

BACKGROUND OF THE INVENTION

1. Field of the Invention

The present invention relates to a snowmobile with an intercooler.

2. Description of the Related Art

As an engine of a snowmobile, a light-weight and high-power two-stroke-cycle engine has been known as a mainstream engine. However, there is a tendency to employ a four-stroke-cycle engine in consideration of environmental conditions.

The four-stroke-cycle engine is larger in overall height than the two-stroke-cycle engine and is provided with a turbocharger or an intercooler in order to obtain an output power equivalent to that obtainable by the same-sized two-stroke-cycle engine as disclosed, for example, in Japanese Unexamined Patent Laid-open (KOKAI) Publication No. 2001-214750).

In the case of a snowmobile having a structure for introducing a traveling wind into an engine room for cooling down the intercooler with the traveling wind, when such snowmobile travels in deep snow, an engine is subjected to a high load, and hence, the temperature of intake-air, which is pressurized by the turbocharger, increases. However, even in such case, as the traveling speed of the snowmobile is significantly lowered, the intake-air cooling efficiency will be also lowered correspondingly. Consequently, even if the turbocharger is employed, improvement of the output of the engine cannot be expected.

In the state in which the snowmobile is stopped after travel, the temperature in the engine room increases because heat from the engine is accumulated therein, and hence, an electronic equipment which can stand up poorly to heat may be adversely affected.

SUMMARY OF THE INVENTION

In view of the circumstances of the conventional art mentioned above, an object of the present invention is to provide a snowmobile with an intercooler which can adequately control the temperature of intake-air irrespective of the loaded condition of an engine of the snowmobile.

This and other objects can be achieved according to the present invention by providing a snowmobile with an intercooler comprising:

a vehicle body;

a pair of lateral steering skids mounted to a front lower surface of the vehicle body;

a crawler mechanism disposed at a portion below a rear side portion of the vehicle body, the crawler mechanism including a drive wheel, a driven wheel and an endless track wound around the respective wheels; and a four-stroke-cycle engine unit disposed in an engine room covered by an engine hood and including an engine body, a turbocharger, an intercooler for cooling an intake-air, which is pressurized and heated up by the turbocharger, in the engine room, and an electric motor-driven cooling fan provided for the intercooler for introducing an outside air to the intercooler through which the air after cooling the intercooler is discharged toward the inside of the engine room.

In preferred embodiments of the above aspect of the present invention, the intercooler and the electric motor-driven cooling fan may be disposed above the engine body. The engine hood is formed with an outside air introducing hole for the intercooler and an air introducing duct for introducing the outside air taken through the outside air introducing hole directly toward the intercooler. On the other hand, the engine room is formed, at its rear portion, with an air exhaust port through which the outside air taken into the engine room is discharged outside the engine room.

It is desirable that the intercooler is disposed in front of the engine body and in front of a heat-generating component toward which the air is blown by the electric motor-driven cooling fan.

The heat generating component may include the turbocharger disposed downstream side of the intercooler in the engine room. The heat generating component may otherwise include an exhaust tube and a muffler disposed in front of the intercooler.

According to a snowmobile with an intercooler of the present invention of the structures mentioned above, even when the sufficient amount of outside air is not introduced into the intercooler, the motor-driven fan forcedly introduces the outside air to the intercooler, so that the cooling efficiency of the intercooler can be prevented from being deteriorated, and hence, the improved stable cooling condition can be maintained continuously effectively irrespective of the loaded condition of the engine or the traveling state of the snowmobile, thus ensuring the a high-output performance of the engine.

Moreover, since the heated air accumulated in the engine room is always discharged toward the outside by the motor-driven fan, the atmospheric temperature in the engine room is restricted from increasing, and hence, the electronic equipment which can stand up poorly to heat is prevented from being adversely affected.

The nature and further characteristic features of the present invention will be made more clear from the following descriptions made with reference to the accompanying drawings.

DESCRIPTION OF THE PREFERRED EMBODIMENTS

Preferred embodiments of the present invention will be described hereunder with reference to the accompanying drawings.

With reference to the accompanying drawings, it is first to be noted that terms "upper", "lower", and the like terms used herein will be generally based on a normally usable (movable) state of the snowmobile, and terms "front", "rear" and the like terms also used herein will be generally based on a normally advancing direction thereof.

Figure 1:
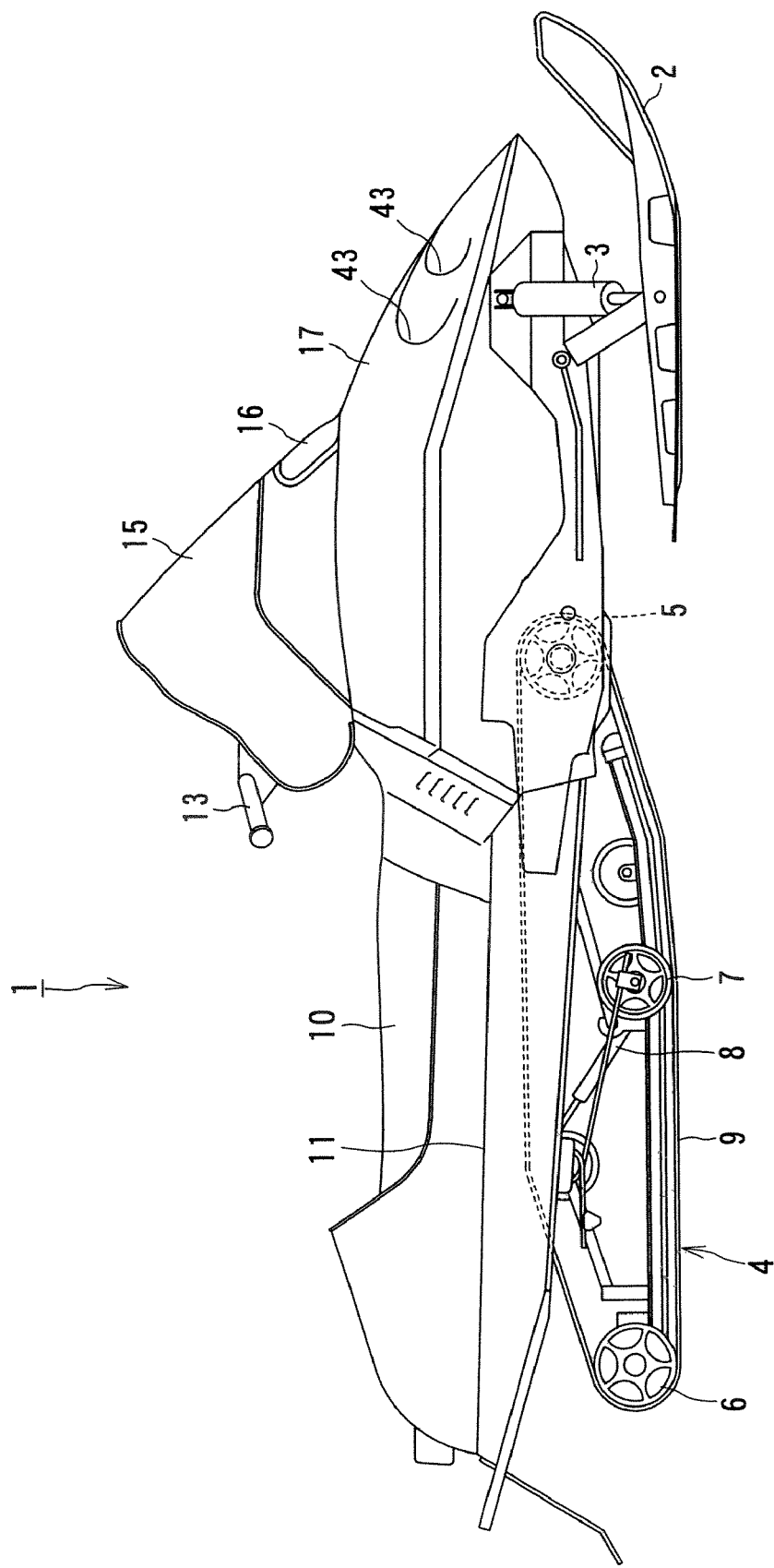
FIG. 1 is a right side view of a snowmobile with an intercooler according to the present invention.
Figure 2:
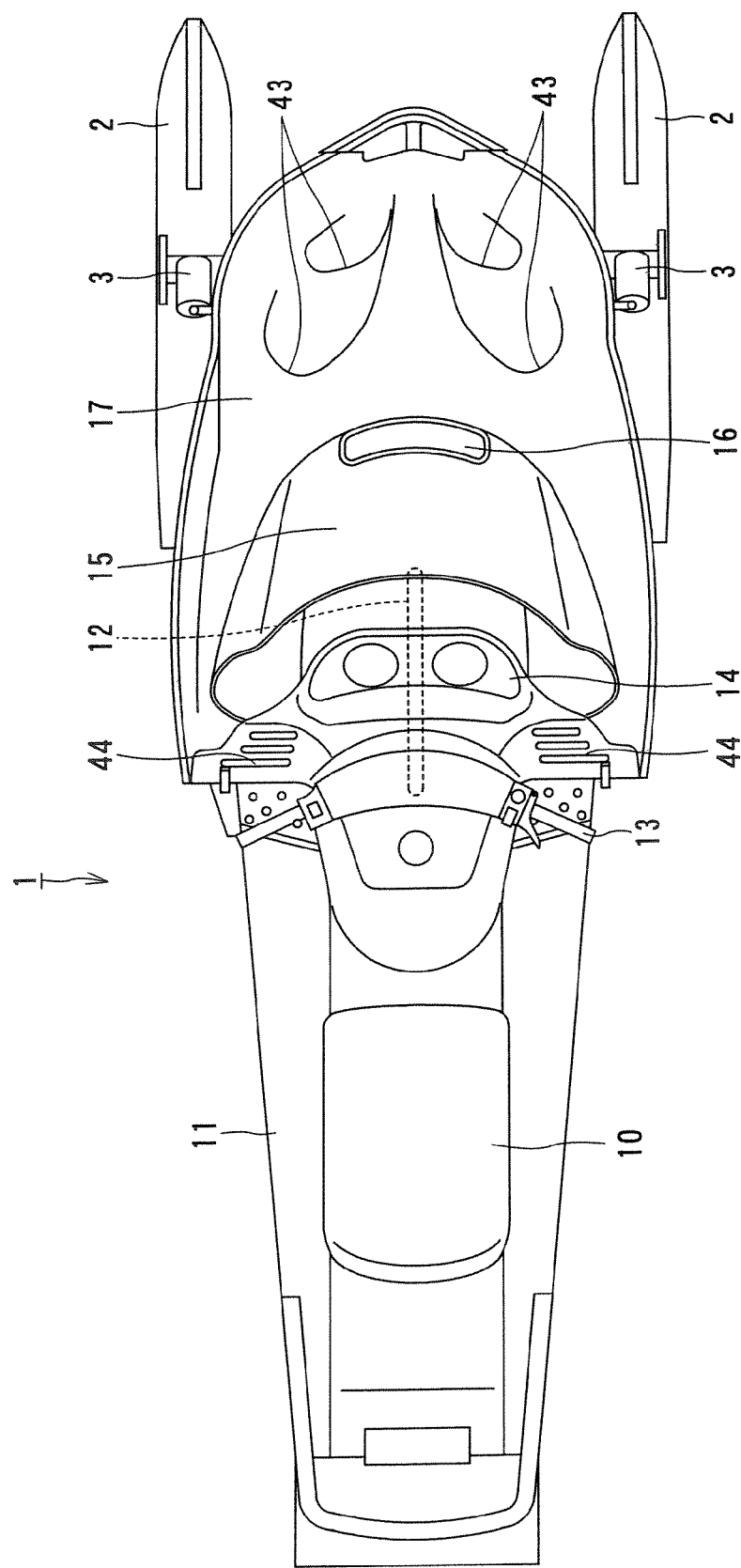
FIG. 2 is a plan view of the snowmobile shown in FIG. 1.

First, with reference to FIG. 1 and FIG. 2, a snowmobile 1 is provided with a pair of left and right steering skids 2 at a portion below the front side of a vehicle body which extends in the fore-and-aft direction so as to be steered leftward and rightward. The steering skids 2 are supported by a front suspension mechanism 3 to be shock-absorbable. On the other hand, a crawler mechanism 4 is provided at a portion below the rear side of the vehicle body. The crawler mechanism 4 includes, for example, a drive wheel 5 disposed on the front side, a driven wheel 6 disposed on the rear side, a plurality of intermediate wheels 7 disposed between the drive wheel and the driven wheel, a rear suspension mechanism 8 for supporting the intermediate wheels 7 to be shock-absorbable, and an endless track 9 wound around the respective wheels.

A driver's seat 10 extending in the fore-and-aft direction is provided above the crawler mechanism 4, and steps 11 are provided on the left and right sides of the driver's seat at positions one-stage lower than the driver's seat. A handle bar 13 for operating the steering skids 2 via a steering shaft 12 is provided in front of the driver's seat 10. A meter panel 14 and a wind shield 15 are provided in front of the handle bar 13, and a head light 16 is provided in front of the meter panel 14 at the front lower end of the wind shield 15. The upper half of the vehicle body is covered by an engine hood 17 so as to be opened and closed, and an engine room 18 is defined therein.

Figure 3:
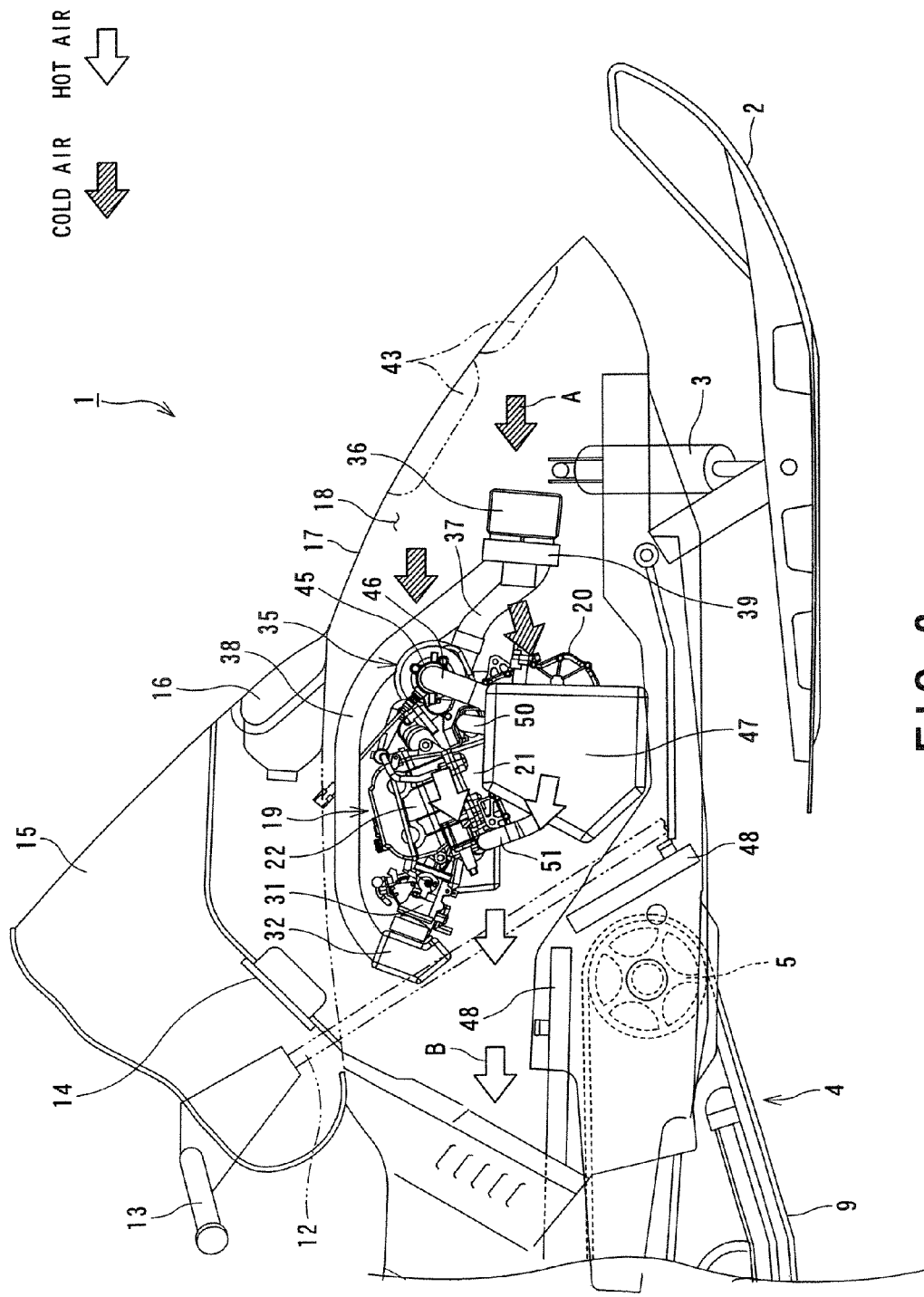
FIG. 3 is a right side view of an engine room according to a first embodiment.
Figure 4:
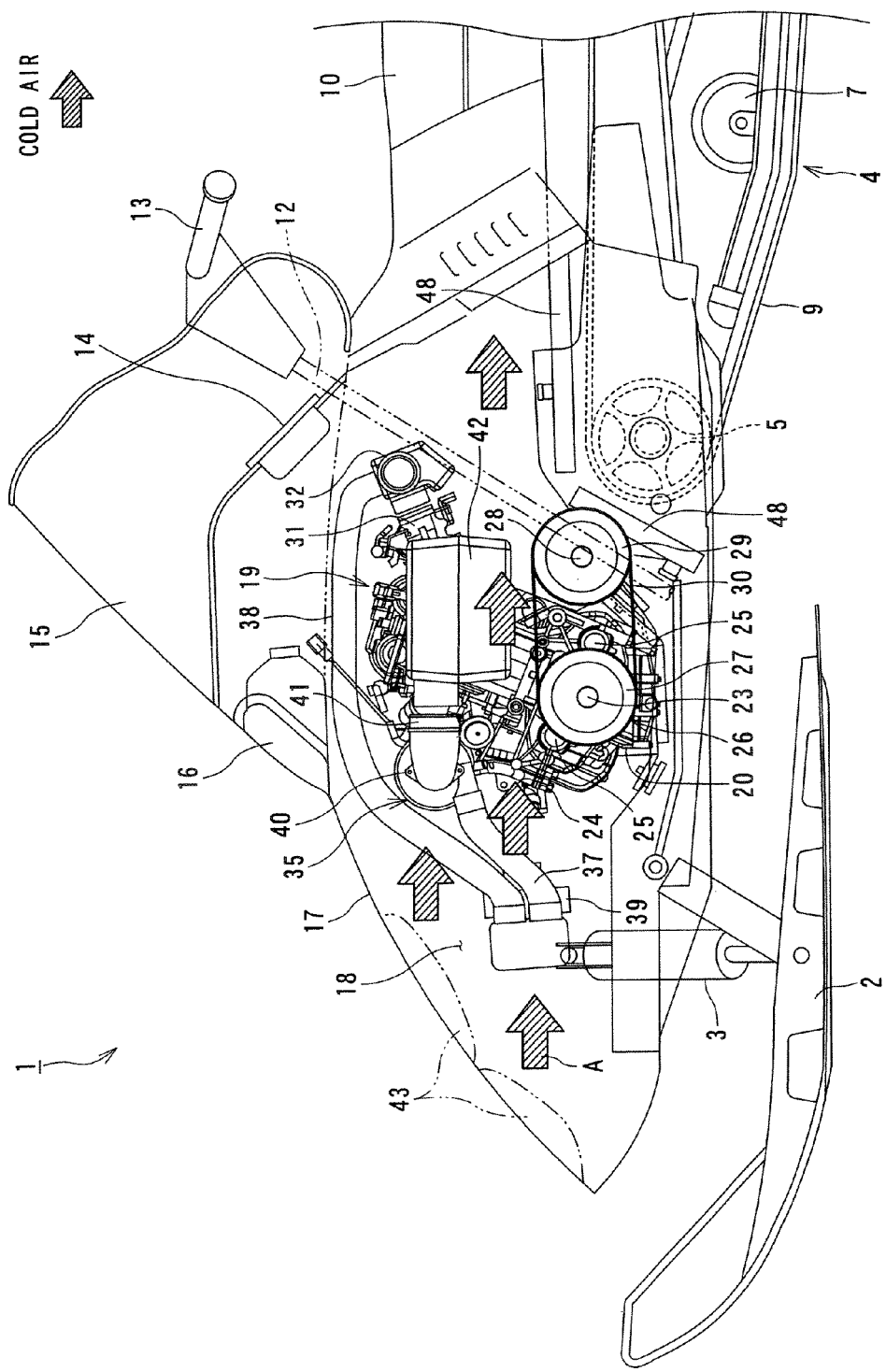
FIG. 4 is a left side view of the engine room of the first embodiment.
Figure 5:
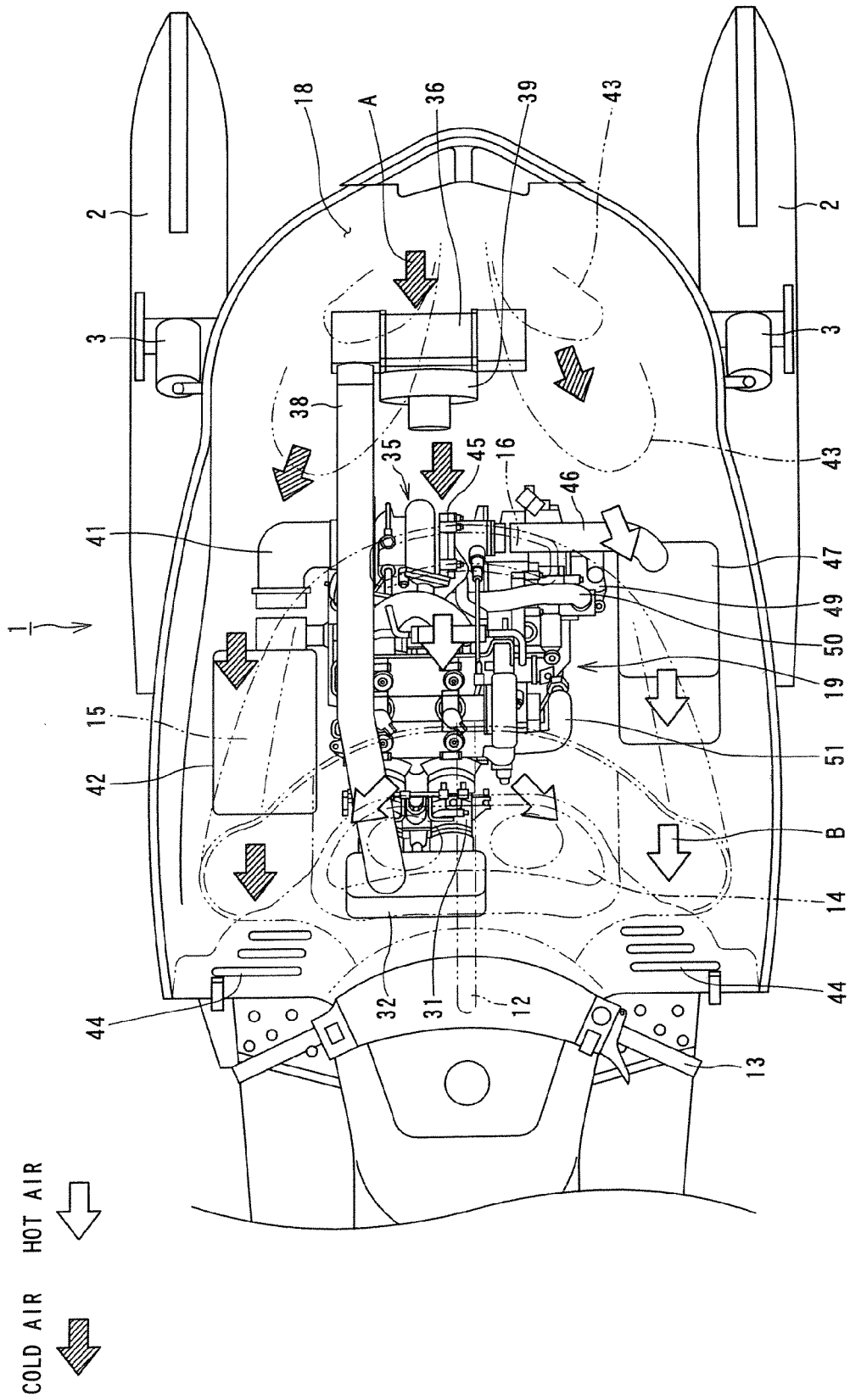
FIG. 5 is a plan view of the engine room of the first embodiment.

FIG. 3 to FIG. 5 show the first embodiment of the present invention, and as shown in FIG. 3 to FIG. 5, an engine unit having an engine body 19 is mounted in the engine room 18. The engine hood 17 has a configure or shape inclining forward downward from the lower front portion of the headlight 16, which is the highest position, so as not to intercept an optical axis of the head light 16. The engine unit (engine body 19) is a water-cooled four-stroke-cycle parallel multi-cylinder (two-cylinder in this embodiment) engine unit using a dry-sump lubricating system, not shown, including a crankcase 20, a cylinder block 21 disposed above the crankcase 20, and a cylinder head 22 disposed above the cylinder block.

The engine body 19, which may be called merely "engine" hereinlater, is disposed laterally so that the axis of a crankshaft 23 which is rotatably journaled in the crankcase 20 extends in the width direction of the vehicle body. The engine body 19 is disposed in such a manner that the cylinder head 22 is disposed downward of the headlight 16, in the side view, in a state being inclined slightly rearward about the crankshaft 23. The engine body 19 is disposed at a position slightly offset sideward in plan view, in this embodiment, leftward with respect to the traveling direction of the vehicle body.

A cylinder, not shown, is formed in the cylinder block 21, and a piston, not shown, is inserted therein to be reciprocally slidable in the right-angled direction with respect to the crankshaft 23. The piston and the crankshaft 23 are connected by a connection rod, not shown, and the reciprocal stroke of the piston is converted, through the connection rod, into the rotational movement of the crankshaft 23.

The engine unit is also provided with a balancer device for reducing its vibrations. The balancer device includes a pair of front and rear balancer shafts 25 disposed on the front side and the rear side of the crankshaft 23, which is clamped between mating surfaces 24 of the crankcase 20 divided into an upper half and a lower half, and balancer weight, not shown, integrally formed with the balancer shafts 25.

The crankshaft 23 has one end, i.e., left side end in the illustrated embodiment, on the side where the engine 19 is offset, so as to project outward the engine 19, and this projected portion is mounted with a drive pulley 27 which constitutes a CVT mechanism (continuously variable transmission) 26 to be rotatable integrally with the crankshaft 23. On the other hand, a drive shaft 28, which is a power transmitting mechanism, is disposed rearward of the engine 19 in parallel with the crankshaft 23, and a driven pulley 29 is provided at the end (left end in this embodiment) of the drive shaft 28 on the side of the drive pulley 27. A driving belt 30 is wound around the drive pulley 27 and the driven pulley 29 so as to transmit the rotational motion of the crankshaft 23 to the drive shaft 28.

On the other hand, a drive sprocket, not shown, is provided on the other end (right end) of the drive shaft 28, and, for example, a drive chain, not shown, is wound around the drive sprocket and a driven sprocket, not shown, provided coaxially with the drive wheel 5 of the crawler mechanism 4 to be rotatable integrally therewith, thus transmitting the rotation of the engine 19 to the crawler mechanism 4.

A throttle body 31 constituting an air-intake system of the engine unit is disposed in a space behind the cylinder head 22 and between the meter panel 14 and the headlight 16 and is attached to the rear of the cylinder head 22. Further, a surge tank 32 is connected to the upstream side, that is, to the rear portion, of the throttle body 31.

On the other hand, the engine unit also includes a turbocharger 35 is disposed in front of the cylinder head 22, an intercooler 36 and a motor-driven type cooling fan 39.

The intercooler 36 for cooling intake-air, which is pressurized and then heated by the turbocharger 35, is disposed at the frontmost position in the engine room 18 located in front of the turbocharger 35. A first air-intake channel 37 extends forward from the turbocharger 35 and is connected to the intercooler 36, and a second air-intake channel 38 extends from the intercooler 36 above the first air-intake channel 37 toward the rear portion and is then connected to the surge tank 32 disposed behind the engine 19.

The electric motor-driven type cooling fan 39 (hereinafter, called "motor-driven fan") is attached to the rear portion of the intercooler 36. The motor-driven fan 39 introduces the external (outside) air on the upstream side of the intercooler 36 thereinto, and discharges the air after having used for cooling the intercooler 36 on the downstream side toward the inside of the engine room 18. The motor-driven fan 39 is disposed at a position where the air discharged therefrom is directed toward heat-generating components, i.e., the engine body 19 and the turbocharger 35 in this first embodiment.

An air intake tube 41 extends from an air-intake port 40 of the turbocharger 35 sideward of the vehicle body, i.e., leftward, in this embodiment, and then rearward, and the upstream side end of the air intake tube is also connected to an air box 42 disposed on the left side of the engine 19. A plurality of outside air introducing holes 43 for introducing outside air into the engine room 18 is formed on the engine hood 17 at positions in front of the upper surface of the intercooler 36. As shown in FIG. 5, the engine room 18 is formed with exhaust ports 44 at the rear portion thereof for discharging air in the engine room 18 outside the engine. These exhaust ports 44 are formed in front of the lateral steps 11 and opened towards the steps 11 so as to exhaust the air inside the engine room 18.

On the other hand, an exhaust pipe 46 is disposed so as to extend from the exhaust port 45 of the turbocharger 35 toward the opposite side of the engine body 19 from the air box 42, in this embodiment, toward the right side, and the downstream side end of the exhaust pipe 46 is connected to a muffler 47 disposed on the right side of the engine body 19. Furthermore, a heat exchanger (for example, radiator) 48 for cooling the engine body 19 is disposed in the front of and above the drive wheel 5.

Coolant (cooling water) cooled by the heat exchanger 48 is pumped up by a water pump 49 disposed on the right side of the crankcase 20 via the coolant hose, not shown, and is delivered to the respective portions in the engine 19 via an engine coolant supply hose 50 by the operation of this water pump 49. The coolant heated up through heat-exchanging operation at the time of cooling down the respective portions of the engine components is delivered to the heat exchanger 48 via an engine coolant return hose 51, and is then cooled down by the heat exchanger 48.

Figure 6:
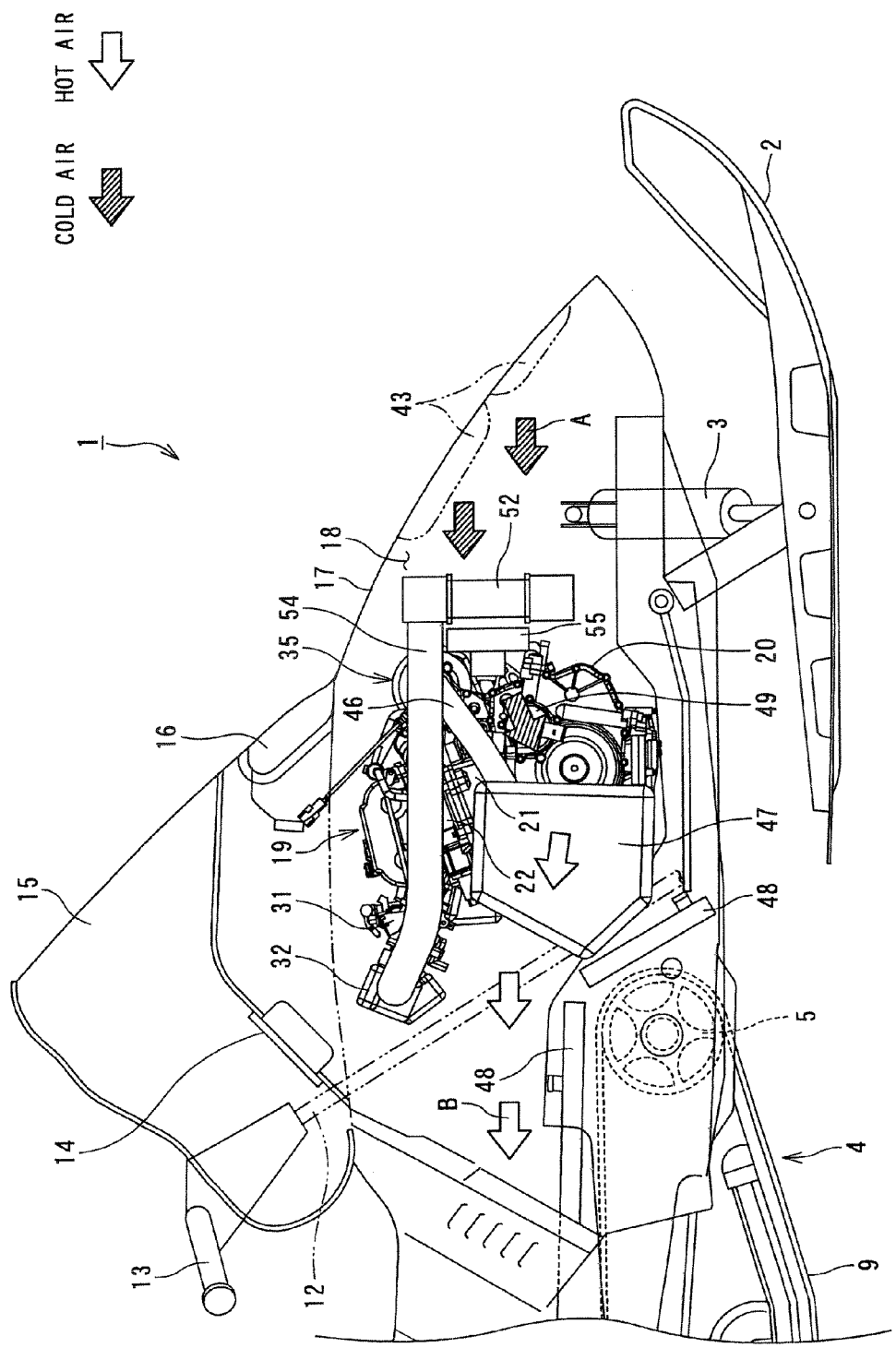
FIG. 6 is a right side view of the engine room according to a second embodiment.
Figure 7:
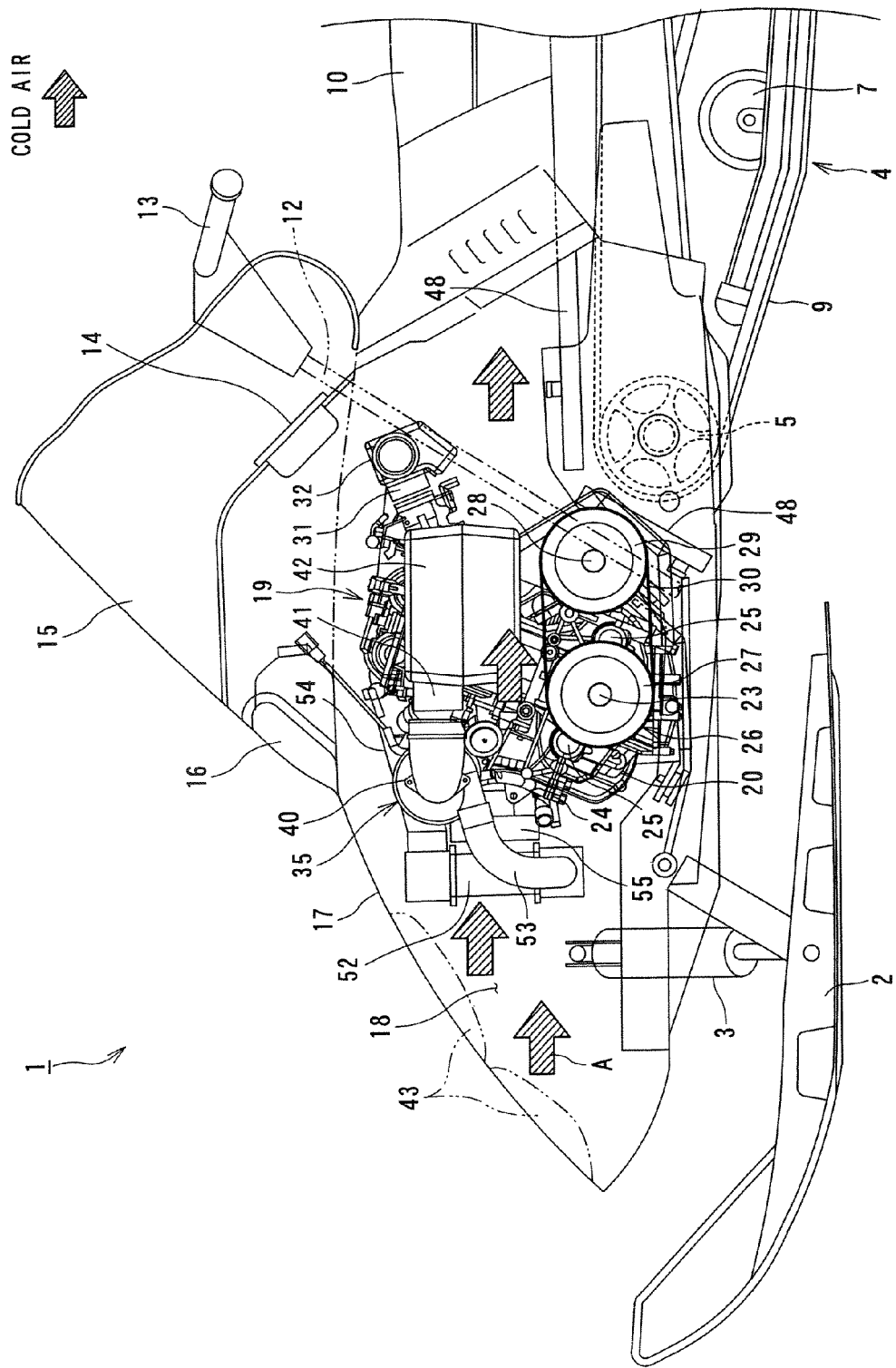
FIG. 7 is a left side view of the engine room of the second embodiment.
Figure 8:
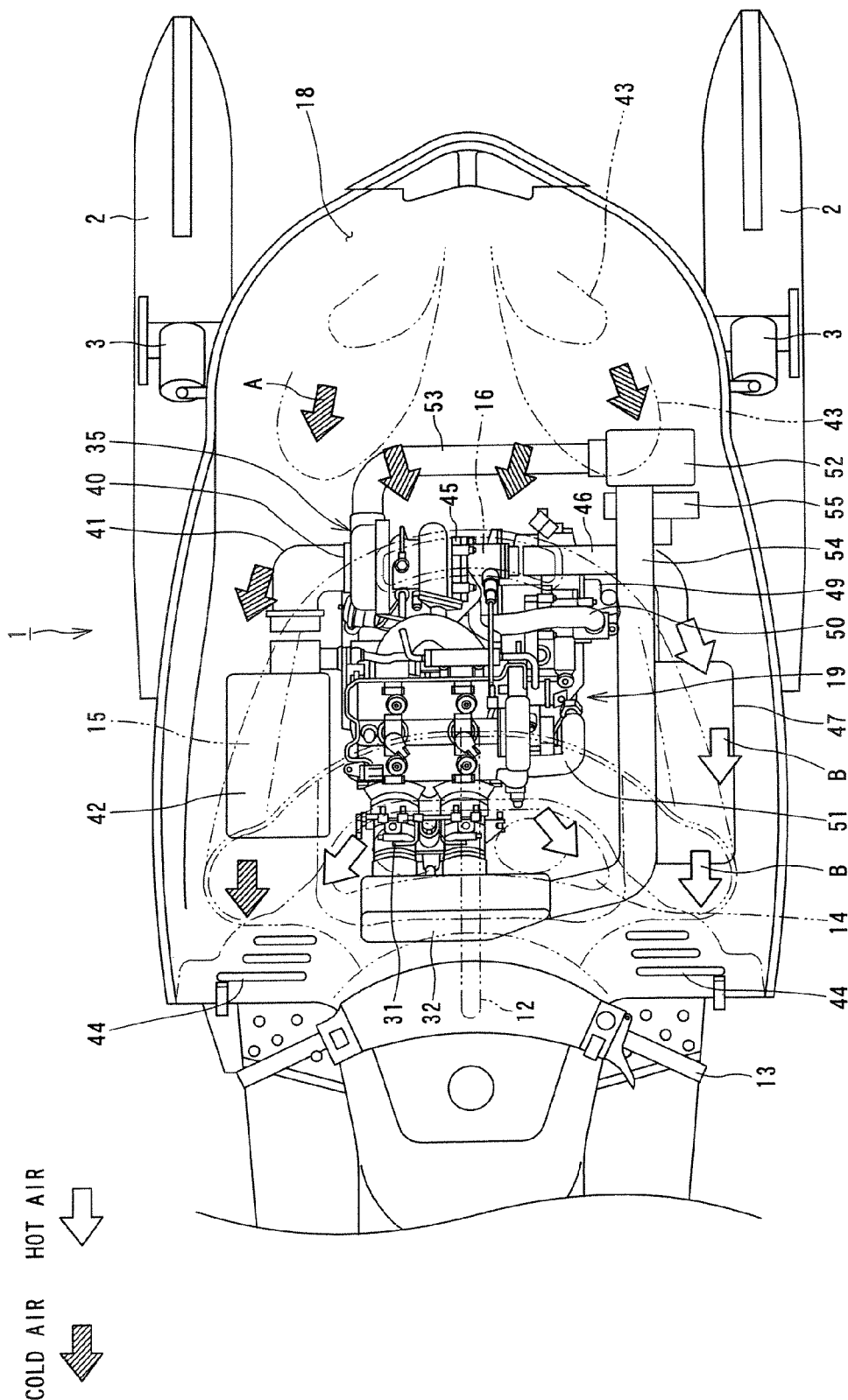
FIG. 8 is a plan view of the engine room of the second embodiment.

FIG. 6 to FIG. 8 show the second embodiment of the present invention, in which the common parts to those shown in the first embodiment are represented by the same reference numerals and detailed description thereof is omitted herein.

As shown in FIG. 6 to FIG. 8, this second embodiment differs from the first embodiment in the layout of an intercooler 52, and according to this difference, associated piping arrangement also differs therefrom.

That is, in the second embodiment, the intercooler 52 is disposed in front of the exhaust pipe 46 and the muffler 47, which are heat-generating components. A first air-intake channel 53 extends from the turbocharger 35 leftward and is connected to the intercooler 52, and a second air-intake channel 54 extends from the intercooler 52 above the muffler 47 toward the rear side and is connected to the surge tank 32 disposed rearward the engine 19.

In addition, a motor-driven fan 55 is mounted to the rear portion of the intercooler 52 at a position so that air discharged therefrom is directed toward the exhaust pipe 46 and the muffler 47 as heat-generating components.

Figure 9:
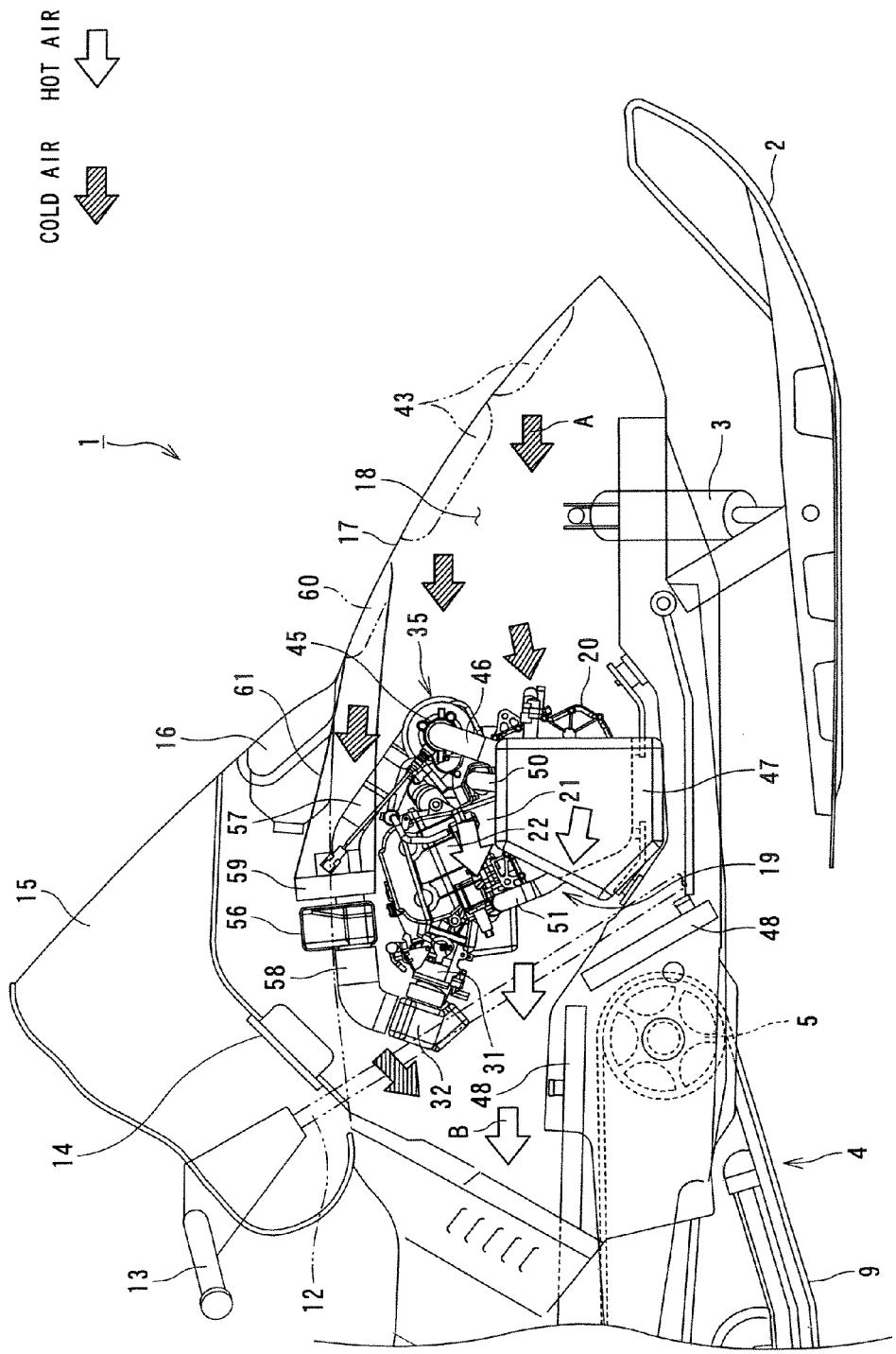
FIG. 9 is a right side view of the engine room according to a third embodiment.
Figure 10:
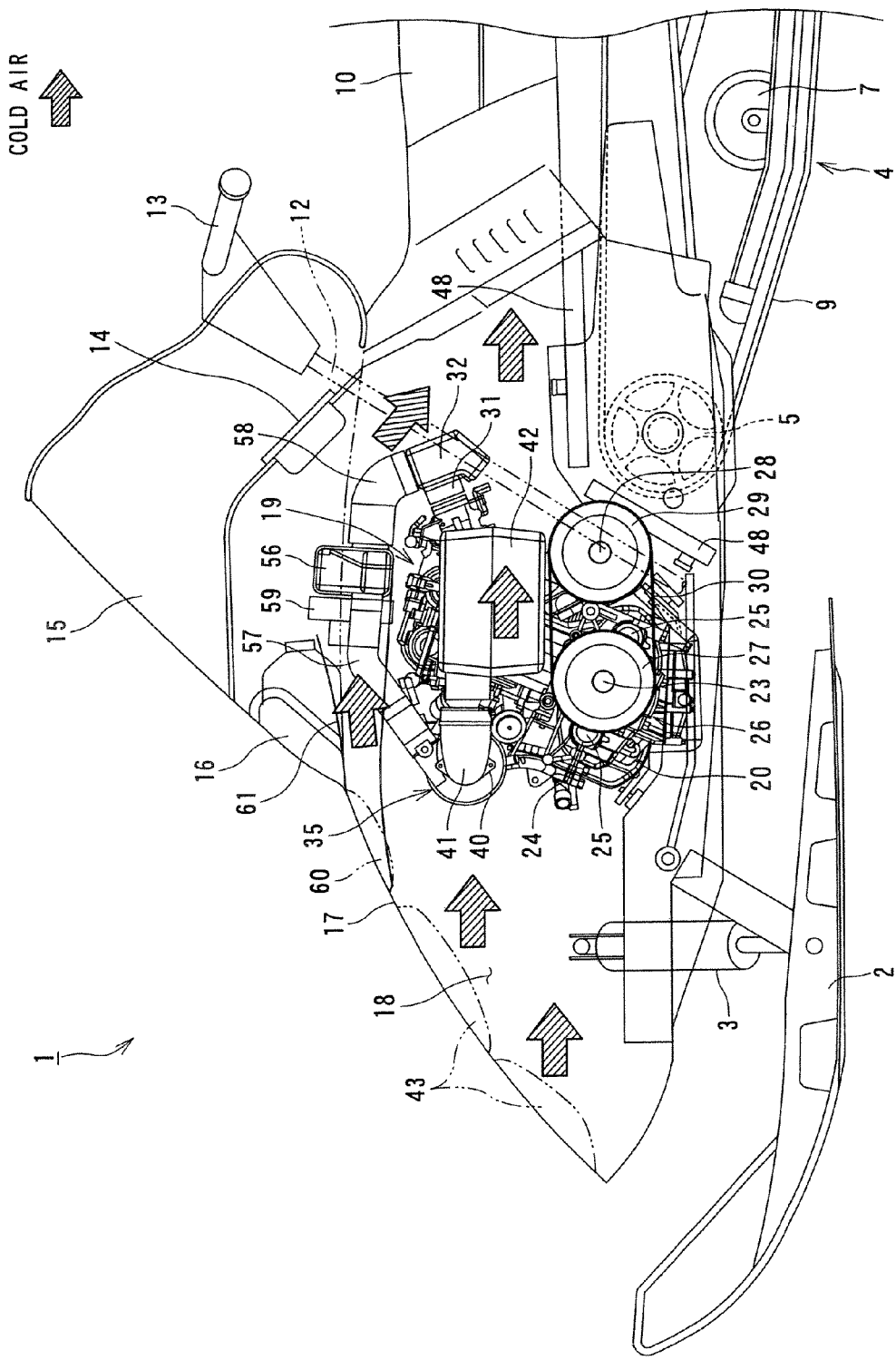
FIG. 10 is a left side view of the engine room of the third embodiment.
Figure 11:
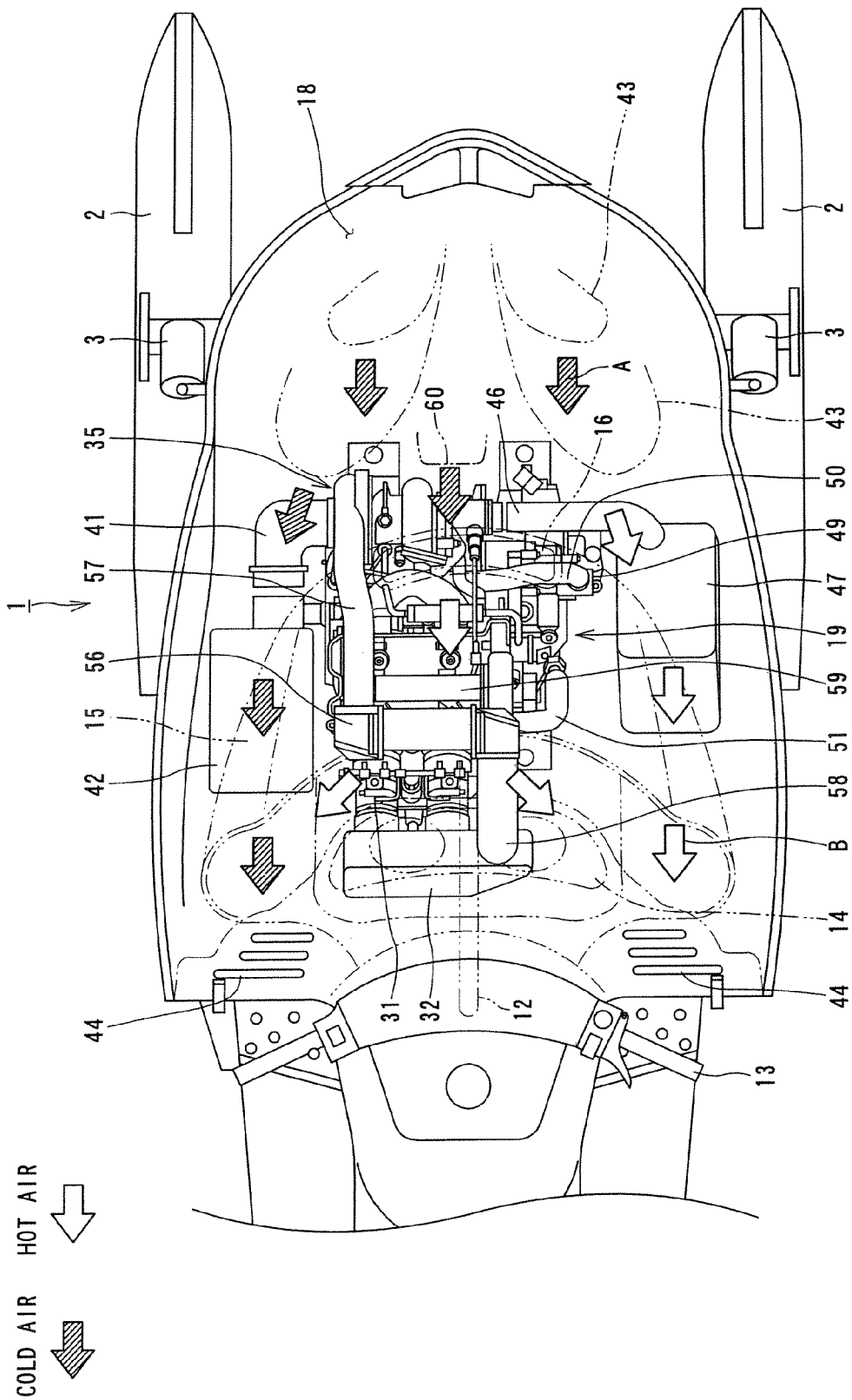
FIG. 11 is a plan view of the engine room of the third embodiment.

FIG. 9 to FIG. 11 show the third embodiment of the present invention, in which the common parts to those shown in the first embodiment are represented by the same reference numerals and detailed description thereof is omitted herein.

As shown in FIG. 9 to FIG. 11, this third embodiment differs from the second embodiment in the layout of an intercooler 56 in the engine room 18, and according to this difference, associated piping arrangement also differs therefrom.

In the third embodiment, an intercooler 56 is disposed substantially vertically in the upper portion in the engine room 18 above the cylinder head 22. A first air-intake channel 57 extends from the turbocharger 35 rearward upward and is connected to the intercooler 56, and the second air-intake channel 58 extends from the intercooler 56 rearward and is connected to the surge tank 32 disposed rearward of the engine 19.

In addition, a motor-driven fan 59 is mounted to a portion in front of the intercooler 56, and an outside air introducing hole 60, which is specific for this intercooler 56, is formed on the engine hood 17 at a position in front of the lower end of the head light 16, and an introducing duct 61 for introducing the outside air taken through the outside air introducing hole 60 directly toward the intercooler 56.

The operation and function of the embodiments described above will be explained hereunder.

The electric motor-driven type cooling fan (motor-driven fan) 39 (55, 59) is mounted to the intercooler 36 (52, 56) for cooling intake-air which is pressurized and then heated by the turbocharger 35. Then, outside air (cold air, for example, arrows A in FIG. 3) on the upstream side of the intercooler 36 (52, 56) is introduced to the intercooler 36 (52, 56) by the motor-driven fan 39 (55, 59), and the downstream air after having used for cooling the intercooler 36 (52, 56) is discharged toward the inside of the engine room 18. Therefore, when the snowmobile 1 travels, for example, on deep snow road or like, even if the traveling speed is significantly lowered, and sufficient outside air is not introduced into the intercooler 36 (52, 56) the motor-driven fan 39 (55, 59) forcedly introduces the outside air toward the intercooler 36 (52, 56), and hence, the cooling efficiency of the intercooler 36 (52, 56) can be effectively maintained without being lowered, and the constantly stable cooling efficiency can be maintained irrespective of the loaded condition of the engine 19 or the traveling state (speed) of the snowmobile 1, thereby ensuring and maintaining the high-output power of the engine 19.

Since an airflow is generated in the engine room 18 by the motor-driven fan 39 (55, 59), the heated air generated by the heat-generating components including engine components (for example, arrows B shown in FIG. 3) is prevented from staying in the engine room 18 and is constantly discharged outward. Consequently, the atmospheric temperature in the engine room 18 is restrained from increasing, and hence, electric equipment which can stand up poorly to heat is prevented from being adversely affected.

Furthermore, the intercooler 36 (52, 56) is disposed in front of the engine body 19 and in front of the heat-generating components, such as the turbocharger 35, the exhaust pipe 46 and the muffler 47, and the motor-driven fan 39 (55, 59) is disposed at a position from which the air is directed toward the heat-generating components. Accordingly, the heat-generating components are positively cooled with high efficiency, and the atmospheric temperature in the engine room 18 can be restrained from increasing. Thus, the temperature of the intake-air can be prevented from increasing, and the electric equipment which can stand up poorly to heat is prevented from being adversely affected.

On the other hand, in the case where the traveling air does not enter so much into the engine room 18, and hence, air ventilation in the engine room 18 is not so sufficient, when the engine unit is operating under the high-loaded condition and the traveling speed of the snowmobile is too low, or when the snowmobile 1 is in the halted state after travel, the air heated through the contacting to the heat-generating components concentrates in the upper section of the engine room 18. In such case, according to the third embodiment of the present invention, by disposing the motor-driven fan 59 above the engine body 19, the heated air can be discharged efficiently.

Furthermore, in the present invention, the intercooler 56 and the motor-driven fan 59 are disposed in the upper section of the engine room 18, and the air introducing hole 60 specific for the intercooler 56 and the air introducing duct 61 for introducing the outside air taken through the outside air introduction hole 60 are arranged on the upper section of the engine hood 17. Therefore, the cold outside air can be introduced toward the intercooler 56 even in the upper section of the engine room 18 at which the heated air is concentrated, and hence, the cooling efficiency of the intercooler 56 with respect to the intake-air can be improved without being deteriorated. Consequently, the constantly stable cooling efficiency can be maintained irrespective of the loaded condition of the engine 19 or the traveling state and speed of the snowmobile 1 with the engine high output power being maintained.

Furthermore, according to the first embodiment of the present invention, since the intercooler 36 is disposed at the front most portion in the engine room 18, the entire width of the vehicle body can be reduced, and the overall height of the vehicle body can be restricted, thus making compact the vehicle body.

Still furthermore, according to the second and third embodiments of the present invention, since the intercooler 52 and 56 are disposed in front of the exhaust pipe 46 and the muffler 47 or in the upper section of the engine room 18, there is no obstacle in front of the engine body 19. Thus, the outside air can be introduced into the engine room 18 efficiently through the outside air introduction hole 43 located in front of the engine body 19, and the heat-generating components such as the engine body 19, the turbocharger 35, the exhaust pipe 46, and the muffler 47 can be cooled down efficiently.

The present invention is not limited to the described embodiments and many other changes and modifications may be made without departing from the scopes of the appended claims.

What is claimed is:

1. A snowmobile with an intercooler comprising:
   a vehicle body;
   a pair of lateral steering skids mounted to a front lower surface of the vehicle body;
   a crawler mechanism disposed at a portion below a rear side portion of the vehicle body, the crawler mechanism including a drive wheel, a driven wheel and an endless track wound around the respective wheels; and
   a four-stroke-cycle engine unit disposed in an engine room covered by an engine hood and including an engine body, a turbocharger, an intercooler for cooling an intake-air, which is pressurized and heated up by the turbocharger in the engine room, and an electric motor-driven cooling fan provided for the intercooler for introducing an outside air to the intercooler through which the air after cooling the intercooler is discharged toward the inside of the engine room,
   wherein the electric motor-driven cooling fan is disposed in front of the intercooler, and the intercooler and the electric motor-driven cooling fan are disposed above a cylinder head of the engine body.

2. The snowmobile with an intercooler according to claim 1, wherein the engine hood is formed with an outside air introducing hole for the intercooler and an air introducing duct for introducing the outside air taken through the outside air introducing hole directly toward the intercooler.

3. The snowmobile with an intercooler according to claim 2, wherein the engine room is formed, at a rear portion thereof, with an air exhaust port through which the outside air taken into the engine is discharged outside the engine room.

4. The snowmobile with an intercooler according to claim 2, wherein the engine body includes a cylinder inclined rearward in the longitudinal direction of the vehicle body so that the cylinder head is positioned below a head light.

5. The snowmobile with an intercooler according to claim 2, wherein an outside air introduction hole for introducing outside air into the intercooler is formed in front of a lower end portion of a head light.

6. The snowmobile with an intercooler according to claim 1, wherein the intercooler and the electric motor-driven cooling fan are disposed in front of a surge tank connected to a rear portion of a throttle body.

7. The snowmobile with an intercooler according to claim 1, wherein the intercooler is disposed behind the turbocharger.

* * * * *